United States Patent [19]
Yagishita et al.

[11] Patent Number: 5,491,506
[45] Date of Patent: Feb. 13, 1996

[54] LIGHT QUANTITY SETTING VALUE DETERMINATION WITH IMPROVED RELIABILITY

[75] Inventors: Takahiro Yagishita, Tokyo; Hajime Yamazaki, Yokohama, both of Japan

[73] Assignee: Ricoh Company, Ltd., Tokyo, Japan

[21] Appl. No.: 966,082

[22] Filed: Oct. 23, 1992

[30] Foreign Application Priority Data

Oct. 31, 1991 [JP] Japan ..................... 3-286709

[51] Int. Cl.⁶ .................................................. G01D 9/42
[52] U.S. Cl. .................................................. 347/246
[58] Field of Search .................... 346/76 L, 108, 346/160; 372/29, 31; 358/302, 298; 347/133, 236, 246

[56] References Cited

U.S. PATENT DOCUMENTS

| | | | |
|---|---|---|---|
| 4,814,791 | 3/1989 | Ohara et al. | 346/108 |
| 4,837,787 | 6/1989 | Takesue et al. | 372/29 |
| 4,856,008 | 8/1989 | Semma et al. | 372/31 |
| 4,890,288 | 12/1989 | Inuyama et al. | 372/31 |
| 4,897,672 | 1/1990 | Horiuchi et al. | 346/160 X |
| 4,926,433 | 5/1990 | Imamura et al. | 372/50 |
| 5,019,913 | 5/1991 | Kiya et al. | 358/296 |
| 5,043,745 | 8/1991 | Inoue et al. | 346/108 |
| 5,107,278 | 4/1992 | Shimada et al. | 346/108 |
| 5,140,601 | 8/1992 | Shimada et al. | 372/29 |
| 5,264,871 | 11/1993 | Tsukada | 346/108 |

*Primary Examiner*—Peter S. Wong
*Assistant Examiner*—Randy W. Gibson
*Attorney, Agent, or Firm*—Cooper & Dunham

[57] ABSTRACT

A light quantity sensing device senses when a light quantity emitted by a light emitting device becomes respectively equal to a plurality of different predetermined light quantities, the light quantity sensing device then providing a plurality of sensing signals corresponding to the plurality of different predetermined light quantities. A setting value determination device determines in response to the plurality of light sensing signals provided by the light quantity sensing device a plurality of light quantity setting values corresponding to the different predetermined light quantities, the plurality of light quantity setting values then being used for driving the light emitting device so that the light emitting device emits the plurality of different predetermined light quantities corresponding to the plurality of light sensing signals. An abnormal condition sensing device senses when the light quantity sensing device does not operate correctly, the abnormal condition sensing device then processing a predetermined operation so as to prevent an undesirable condition being caused by the incorrect operation.

28 Claims, 17 Drawing Sheets

FIG.12

| A/D CONVERTED VALUE Dm | (A) Dm1 | (B) Dm2 |
|---|---|---|
| | 55 | 92 |
| | 56 | 94 |
| | ... | ... |
| | 61 | 102 |
| | ... | ... |
| | 68 | 114 |

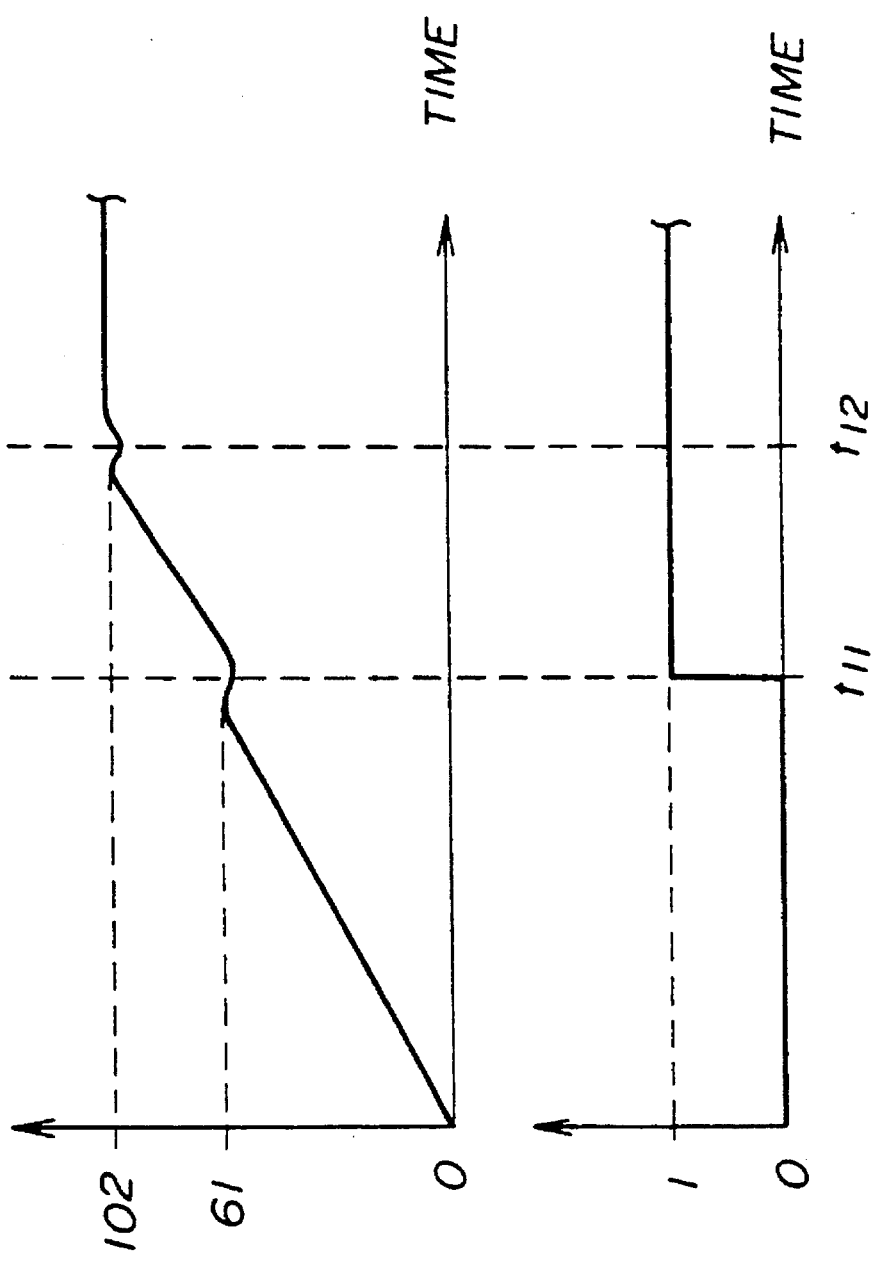

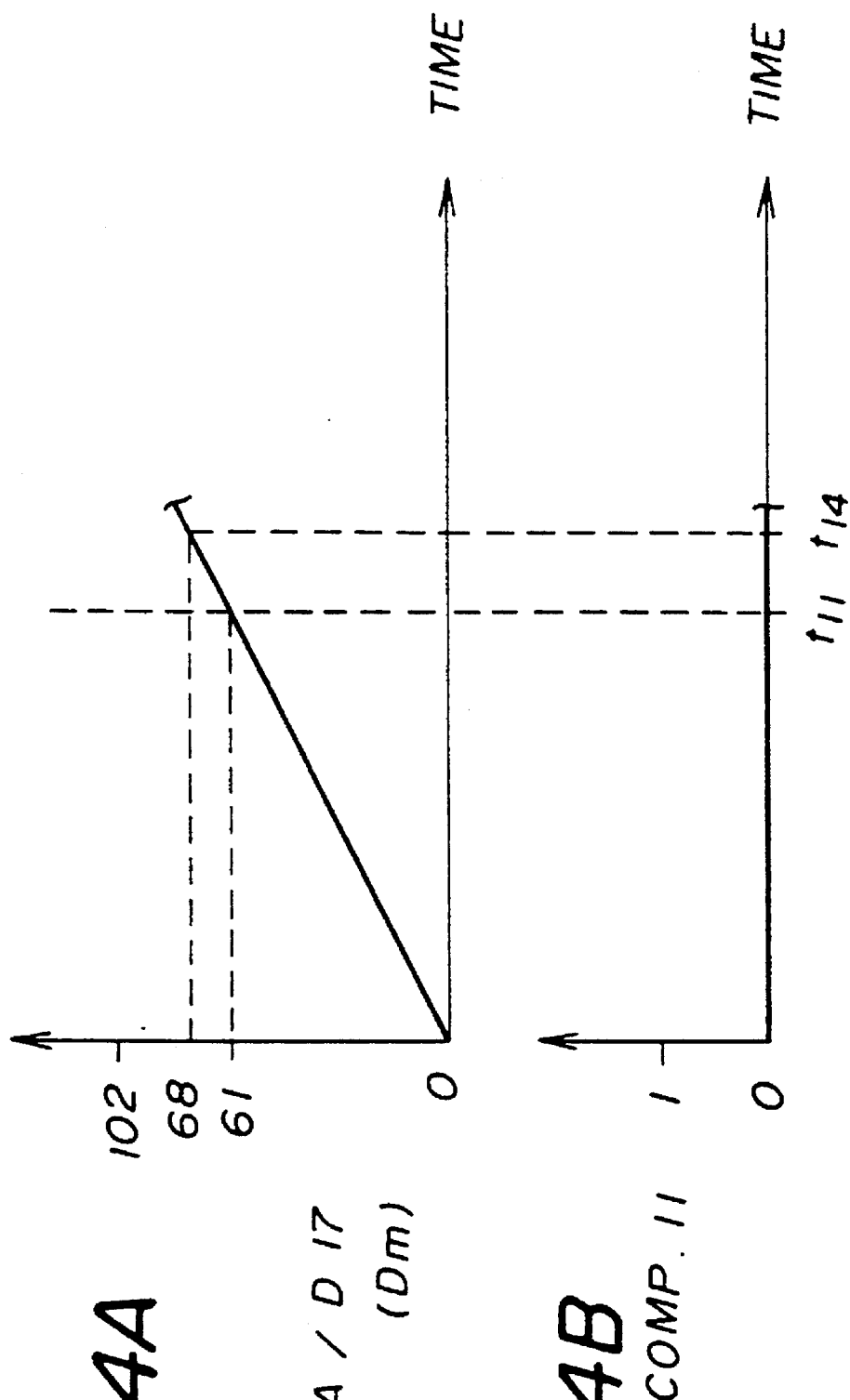

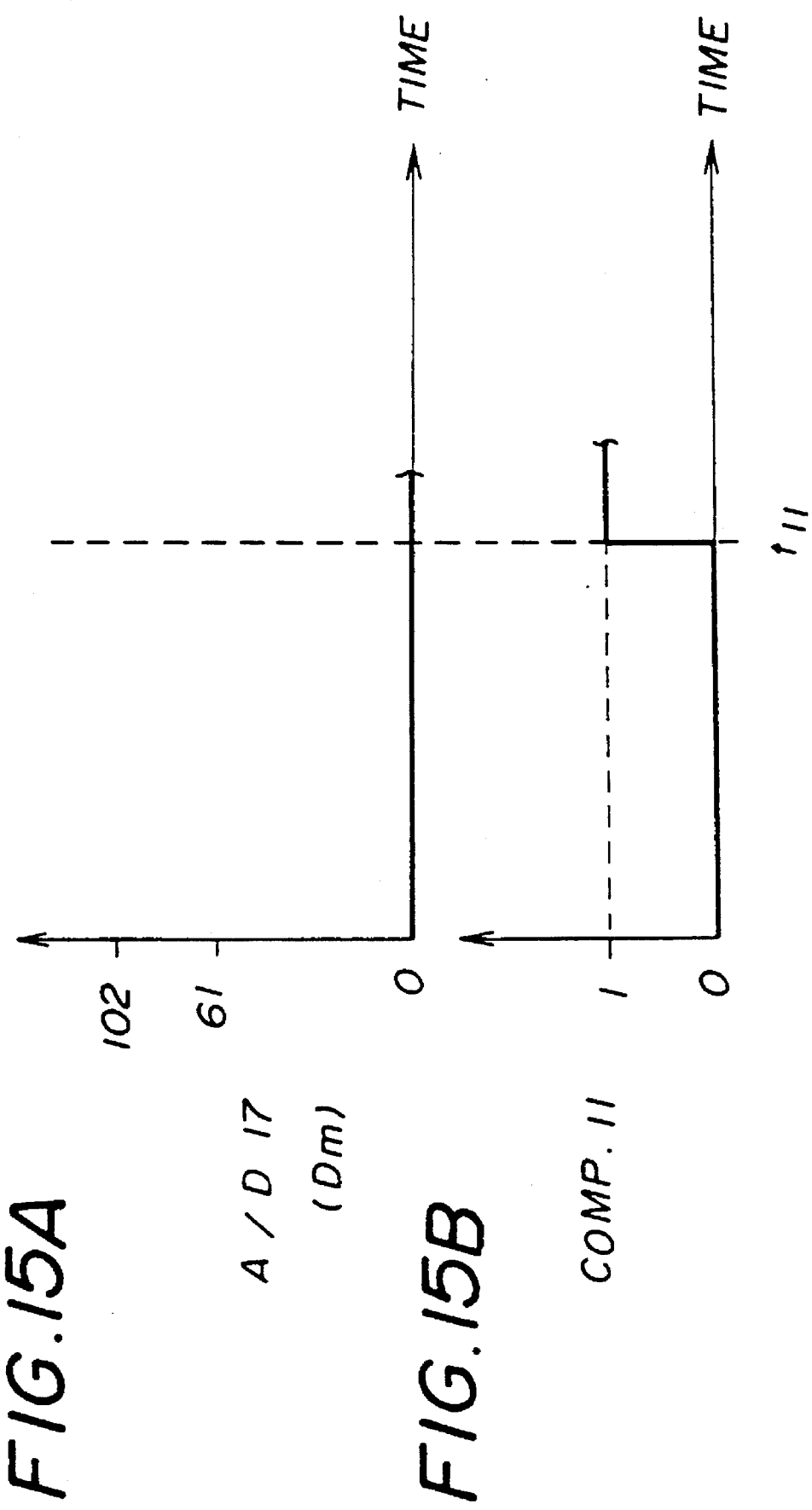

LIGHT QUANTITY SETTING VALUE DETERMINATION WITH IMPROVED RELIABILITY

BACKGROUND OF THE INVENTION

This invention relates to a light quantity setting value determination apparatus and method, and more particularly to a laser printer or other image forming apparatus having a light quantity setting value determination apparatus and method, which writes an image with light by means of a laser beam, a digital duplicator, and other such kinds of image forming apparatus, and even more particularly to a technology in which light emission of a laser diode( light emitting means) is controlled so that a plurality of different predetermined light quantities emitted by the laser diode are set.

A typical example of such an image forming apparatus is described below with reference to FIG. 1. FIG. 1 shows a block diagram of a writing-with-light part of a laser printer of a first embodiment according to the present invention and of the related art.

A laser diode(LD) driver 2 drives a laser diode 1 so as to make it emit light in response to a video signal as a result of modulation. Laser light emitted from the laser diode 1 is deflected by a polygon mirror 3 so that the deflected light is raster-scanned on a photosensitive body 5 via fθ lens 4 and a mirror or other light processing parts, resulting in an electrostatic latent image being formed on the photosensitive body 5.

The quantity of the laser light is controlled by an electric current Iop, which flows through the laser diode 1. The electric current Iop is controlled by data, which is set in a digital/analog(D/A) converter 7 by means of a CPU 6.

FIG. 2 shows a relationship between the electric current Iop flowing through the laser diode 1 and a quantity P of light emitted from the laser diode 1 as a result of the electric current Iop flowing through the laser diode 1.

This relationship varies depending on a particular laser diode, variations of temperature, or a period of time which has elapsed since the electric current Iop was generated, as shown, for instance, by curves a, b, and c of FIG. 2. Thus, the above mentioned relationship cannot be predetermined.

Therefore, electric current flowing through the laser diode 1 should be adjusted as required to make the diode 1 emit a desired quantity of light.

Controlling of this light quantity by automatic adjustment is called APC(auto power control ).

APC can be performed by using a photo diode 8 which senses a laser light quantity. A part of the laser light emitted from the laser diode 1 is applied to the photo diode 8, then the photo diode 8 allows an electric current Im to flow, the quantity of which current Im is in proportion to a quantity of the light of the part of laser light applied to the photo diode 8. The current Im is converted into a voltage Vm(a monitoring voltage) by means of a resistance 9, then the voltage Vm is measured by means of an operational amplifier 10 so that the laser light quantity emitted from the laser diode 1 can be measured.

Further, a measuring voltage provided from the amplifier 10 is compared with respective predetermined reference voltages(in this case, 1.2 volts and 2.0 volts) by means of respective comparators 11 and 12. Then, results of the comparison are each supplied as feed back signals to the CPU 6 through respective ports 13 and 14.

Then, the CPU 6 sets certain data in the D/A convertor 7 as a result of its checking the above mentioned feed back signals so as to control the LD driver 2.

A ROM(read only memory) 15 having a preliminary program stored therein to be executed by the CPU 6 and a RAM(random access memory) 16 used as a working memory by the CPU 6 are each connected to the CPU 6.

FIG. 3 shows a relationship between the light quantity P emitted from the laser diode 1 and a monitoring current Im flowing through the photo diode 8 as a result of the light quantity P being sensed. FIG. 4 shows a relationship between the above mentioned light quantity P and the monitoring voltage Vm as a result of the light quantity P being sensed via the photo diode 8 and the resistance 9.

As shown in FIG. 3, the current Im flowing through the photo diode 8 is 0.6 milliamperes(mA) when the laser diode 1 emits 3 milliwatts(mW) of a first light quantity $P_1$. Then, an electric potential occurs in the resistance 9, that is, the monitoring voltage Vm becomes 1.2 volts(V) if a resistance value of the resistance 9 is 2 kiloohms(kΩ). Then this 1.2 V of Vm puts the comparator 11 in an inverting condition where the comparator 11 is inverted. That is, APC of $P_1$ of 3 mW(controlling light quantity emitted by the laser diode 1 to be $P_1$ of 3 mW) is realized by an operation of the CPU 6 in which a set value Ds to be set in the D/A converter 7 is determined, the comparator 11 being put in the above mentioned inverting condition when the set value Ds is set in the D/A converter 7.

After the set value Ds has been determined once, a subsequent operation can soon be executed using such a value Ds, the subsequent operation being one in which writing-with-light using an adjusted light quantity is performed just at the moment when the subsequent operation is needed without having to wait for the value Ds to be determined.

Then, parts in the writing-with-light-part except for image printing process means such as the above mentioned polygon mirror 3, the fθ lens 4, and the photosensitive body 5, act as a light quantity setting value determination apparatus.

There may be a case where the laser diode 1 has to emit another light quantity $P_2$ instead of, for example, $P_1$ of 3 mW, soon after the completion of the above mentioned APC of $P_1$ 3 mW. In such a case, APC for at least two light quantities $P_1$ and $P_2$ should be executed at the same time.

There are two purposes why the laser diode 1 should emit a plurality of light quantities as mentioned above(in the above example, there are two light quantities). A first purpose is to realize so called shading compensation by which a laser light quantity should be changed to correspond to various positions on a laser scanning line on the photosensitive body 5. Such compensation is needed to compensate for a variation in the darkness of a printed image on a sheet of paper, which variation in darkness may be caused, even if the electric current Iop is constant, due to a certain reason related to light distribution characteristics of an image printing process which employs the laser diode 1, the polygon mirror 3, the fθ lens 4 and the photosensitive body 5. A second purpose is to set a desired darkness of the printed image.

The writing-with-light part as shown in FIG. 1 can execute APC for both 3 mW and 5 mW of light quantities. As shown in FIG. 1, in a case where APC for a plurality of light quantities can be executed, a plurality of comparators are provided in the related art for generating a plurality of feed back signals.

An operation of the writing-with-light part a shown in FIG. 1 is described below with reference to FIG. 5(an operational flow chart), and FIGS. 6 through 8(time charts of outputs of the comparators 11 and 12 ).

After APC is started, data(being referred to as "D/A set value Ds" hereinafter, and acting as a light quantity setting value) set in the D/A converter 7 is increased in a step(the word "step" is omitted for the sake of simplifying the description hereinafter) S2 in FIG. 5. Then, when the light quantity emitted by the laser diode 1 becomes equal to a first light quantity $P_1$, the output of the comparator 11(referred to as "COMP.11" in FIGS. 6B through 8B) is inverted from "0" to "1" at a time $t_1$ shown in FIG. 6B. Thus, S3 is executed after S1 in FIG. 5, that is, the D/A set value Ds(referred to as "D/A VALUE Ds" in FIG. 5) at the current time is saved(stored).

After this, the D/A set value Ds is further increased in S5, then the light quantity emitted by the laser diode 1 becomes equal to a second light quantity $P_2$. Then, the output of the comparator 12( referred to as "COMP.12" in FIGS. 6A through 8A) is inverted from "0" to "1" at a time $t_2$ shown in FIG. 6A. Thus, S6 is executed after S4 in FIG. 5, that is, the D/A set value Ds at the current time is saved(stored ). Then, APC is finished.

However, if an error is included in information fed back from the comparator 11, after APC has started, even if the light quantity emitted from the laser diode 1 exceeds the first light quantity $P_1$, the output of the comparator 11 cannot be inverted, as shown(as a solid line) at $t_1$ in FIG. 7B. Thus, the CPU 6 still continues to execute S2 in FIG. 5, that is, the D/A set value Ds is further increased by an undesirable amount resulting in damage occurring in the laser diode 1.

Similarly, if an error is included in information fed back from the comparator 12, after completion of the setting operation of the first light quantity $P_1$ in the laser diode 1 by means of the CPU 6 via D/A converter 7, even if the light quantity emitted from the laser diode 1 exceeds the second light quantity $P_2$, the output of the comparator 12 cannot be inverted as shown(as a solid line) at $t_2$ in FIG. 8A. Thus, the CPU 6 still continues to execute S2 in FIG. 5, that is, the D/A set value Ds is further increased by an undesirable amount resulting in damage occurring in the laser diode 1.

Further, in a case where an abnormal condition occurs in either of the comparators 11 or 12, then a normal APC cannot be executed until this abnormal condition is removed.

SUMMARY OF THE INVENTION

A general object of the present invention is to provide a light quantity setting value determination apparatus and method having improved reliability and having a function for providing necessary values for a subsequent process so that the subsequent process can be soon executed without any interruption even if a certain abnormal condition which may prevent the above mentioned apparatus or method from providing the necessary values, occurs.

To achieve the above general object, a composition of a light quantity setting value determination apparatus according to the present invention is provided, which apparatus comprises:

light quantity sensing means for sensing when a light quantity emitted by a light emitting means becomes respectively equal to a plurality of different predetermined light quantities, the light quantity sensing means then providing a plurality of sensing signals corresponding to the plurality of different predetermined light quantities;

setting value determination means for determining in response to the plurality of light sensing signals provided by the light quantity sensing means a plurality of light quantity setting values corresponding to the different predetermined light quantities, the plurality of light quantity setting values being then used for driving the light emitting means so that the light emitting means emits the plurality of different predetermined light quantities corresponding to the plurality of light sensing signals;

abnormal condition sensing means for sensing when the light quantity sensing means does not operate correctly, the abnormal condition sensing means then processing a predetermined operation so as to prevent an undesirable condition being caused by the incorrect operation.

A particular object of the present invention is to provide a light quantity setting value determination apparatus and method wherein damage to a light emitting means diode can be avoided, which damage may occur as a result of an abnormal condition occurring in a light quantity sensing signal to be used in APC. Further, APC can be executed even if such an abnormal condition occurs.

To achieve the particular object, another composition of the light quantity setting value determination apparatus according to the present invention is provided, wherein the above mentioned undesirable condition is one in which the light emitting means emits excessive light quantities.

In the above mentioned composition, excessive emitting of light quantities from the light emitting means is prevented so that damage to the light emitting means can be prevented.

Another composition of the light quantity setting value determination apparatus according to the present invention comprises:

light quantity sensing means for sensing when a light quantity emitted by a light emitting means becomes respectively equal to a plurality of different predetermined light quantities, the light quantity sensing means then providing a plurality of sensing signals corresponding to the plurality of different predetermined light quantities; and setting value determination means for determining in response to the plurality of light sensing signals provided by the light quantity sensing means a plurality of light quantity setting values corresponding to the different predetermined light quantities, the plurality of light quantity setting values being then used for driving the light emitting means so that the light emitting means emits the plurality of different predetermined light quantities corresponding to the plurality of light sensing signals;

wherein the light quantity sensing means comprises: light quantity measuring means for measuring a light quantity emitted by the light emitting means; analog/digital converting means for converting a measuring signal acting as an analog signal provided by the light quantity measuring means into a digital signal; and comparing means for comparing the measuring signal acting as an analog signal with a predetermined reference value, the comparing means then providing a result of the comparison as a binary-level signal.

Another composition of the light quantity setting value determination apparatus according to the present invention comprises:

light quantity sensing means for sensing when a light quantity emitted by a light emitting means becomes respectively equal to a plurality of different predetermined light quantities, the light quantity sensing means then providing a plurality of sensing signals corresponding to the plurality of different predetermined light quantities;

setting value determination means for determining in response to the plurality of light sensing signals provided by the light quantity sensing means a plurality of light quantity setting values corresponding to the different predetermined light quantities, the plurality of light quantity setting values being then used for driving the light emitting means so that the light emitting means emits the plurality of different predetermined light quantities corresponding to the plurality of light sensing signals; and complementary determining means for sensing when the light quantity sensing means does not operate correctly, that is, the light quantity sensing means does not provide the plurality of sensing signals correctly, the complementary determining means then complementarily determining a correct sensing signal of the plurality of sensing signals.

In the above mentioned composition, the light quantity setting value determination apparatus can provide light quantity setting values even if the light quantity sensing means does not operate correctly(an abnormal condition), so that a subsequent process needing such light quantity setting values can continue a certain operation using these values without waiting for the cause of such an abnormal condition in the light quantity sensing means to be removed.

Other objects and further features of the present invention will become more apparent from the following detained description when read in conjunction with the accompanying drawings.

BRIEF DESCRIPTION OF THE DRAWINGS

FIG. 12 is a reference table used by the CPU in the control block shown in FIG. 10, showing a relationship between (A) A/D value $Dm_1$ corresponding to a first light quantity $P_1$ emitted from the laser diode and (B) A/D value $Dm_2$ corresponding to a second light quantity $P_2$ emitted from the laser diode;

FIGS. 13A and 13B are time charts showing a relationship between an A/D converted value Dm of an A/D converter and the output of the comparator when the light quantity emitted from the laser diode is increased when the second embodiment according to the present invention is under a normal condition;

FIGS. 14A and 14B are time charts showing a relationship between an A/D converted value Dm of the A/D converter and the output of the comparator when the light quantity emitted from the laser diode is increased when the comparator of the second embodiment according to the present invention is under an abnormal condition; and FIGS. 15A and 15B are time charts showing a relationship between an A/D converted value Dm of the A/D converter and the output of the comparator when the light quantity emitted from the laser diode is increased when the A/D converter 17 of the second embodiment according to the present invention is under an abnormal condition.

DESCRIPTION OF THE PREFERRED EMBODIMENTS

Figure 9:
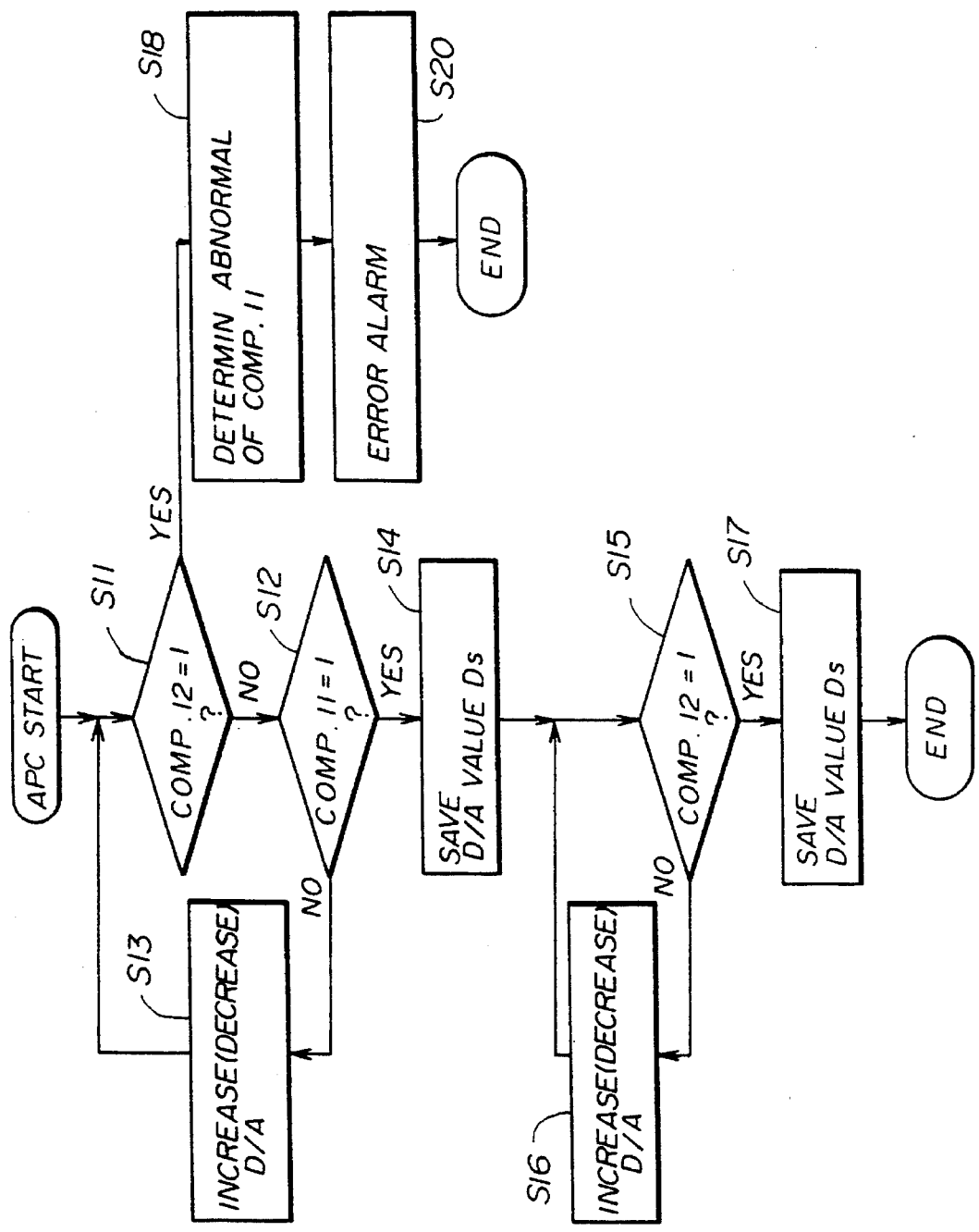
FIG. 9 shows an operating flow chart of an APC process performed by the CPU in the control block of the first embodiment according to the present invention shown in FIG. 1.

An operation of a writing-with-light part of a laser printer of a first embodiment of a light quantity setting value determination apparatus and method according to the present invention and an image forming apparatus according to the present invention are described below with reference to FIG. 9(showing an operation flow chart). A control block diagram for a writing-with-light part of a laser printer of this first embodiment is the same as that shown in FIG. 1 mentioned above, however the processing function executed by the CPU 6 is different from the processing function executed by the CPU 6 in the laser printer in the related art described in BACKGROUND OF THE INVENTION.

The photo diode 8, amplifier 10, and comparators 11 and 12 act as light quantity setting means. The CPU 6 acts as setting value determination means and abnormal condition sensing means.

Figure 1:
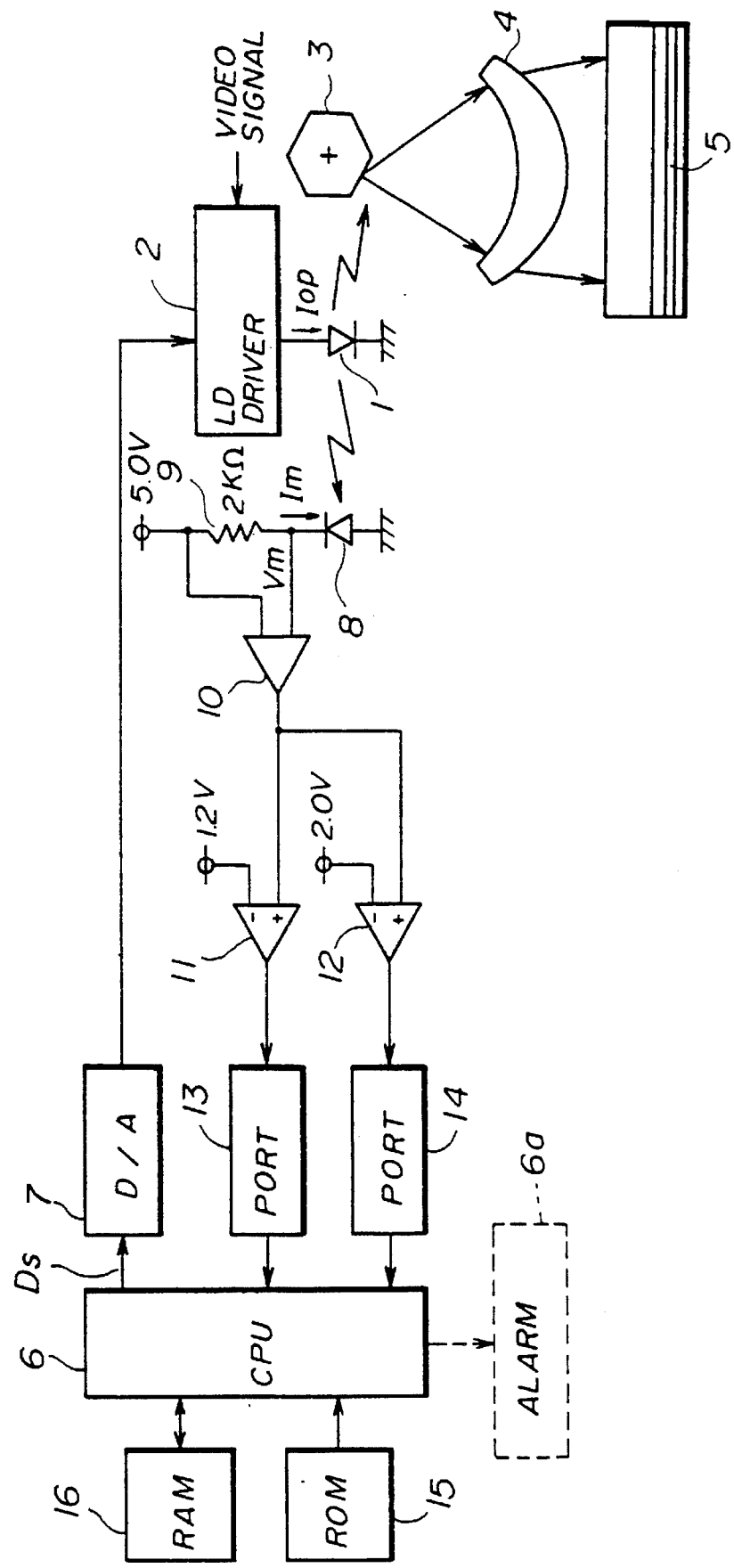
FIG. 1 shows a control block diagram of a writing-with-light part of a laser printer of a first embodiment according to the present invention and of the related art.
Figure 2:
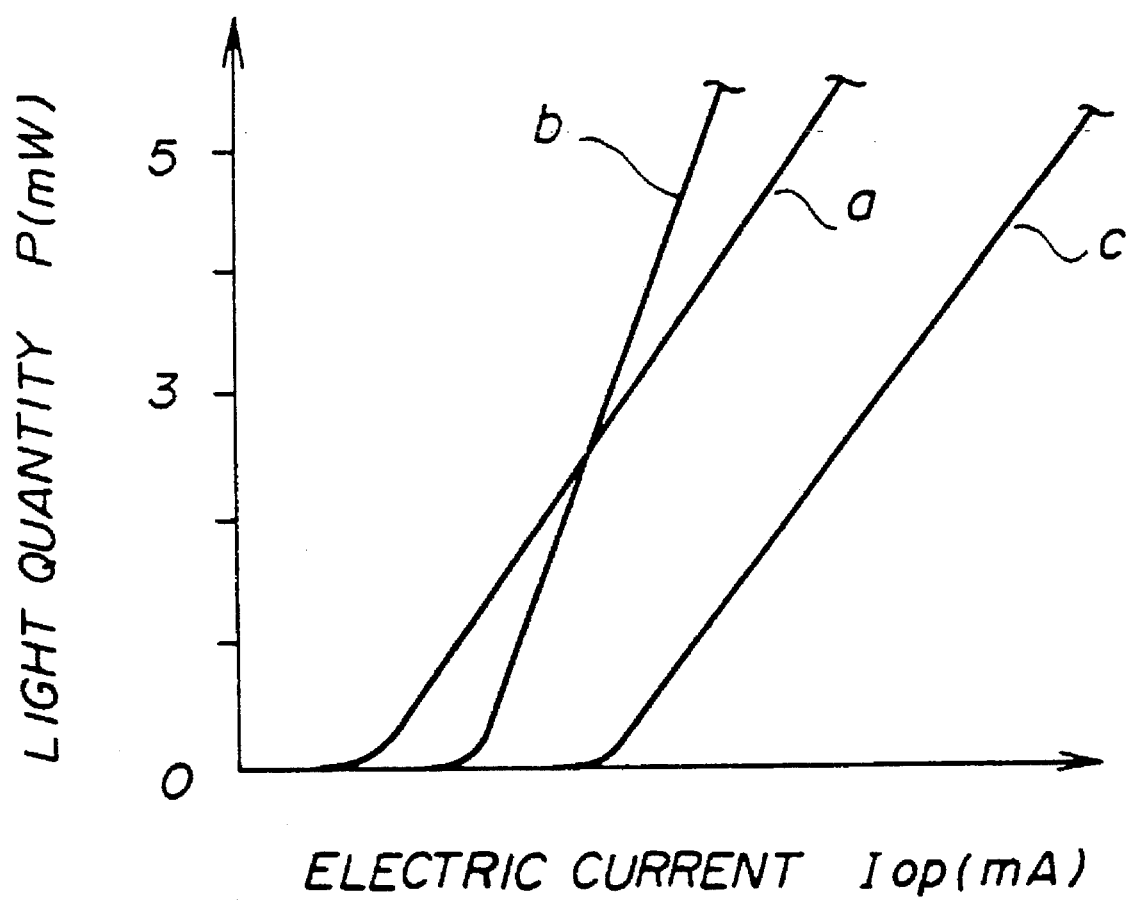
FIG. 2 is a graph showing a relationship between an electric current flowing through a laser diode and a light quantity emitted from the laser diode as a result of the electric current flowing through the laser diode.
Figure 3:
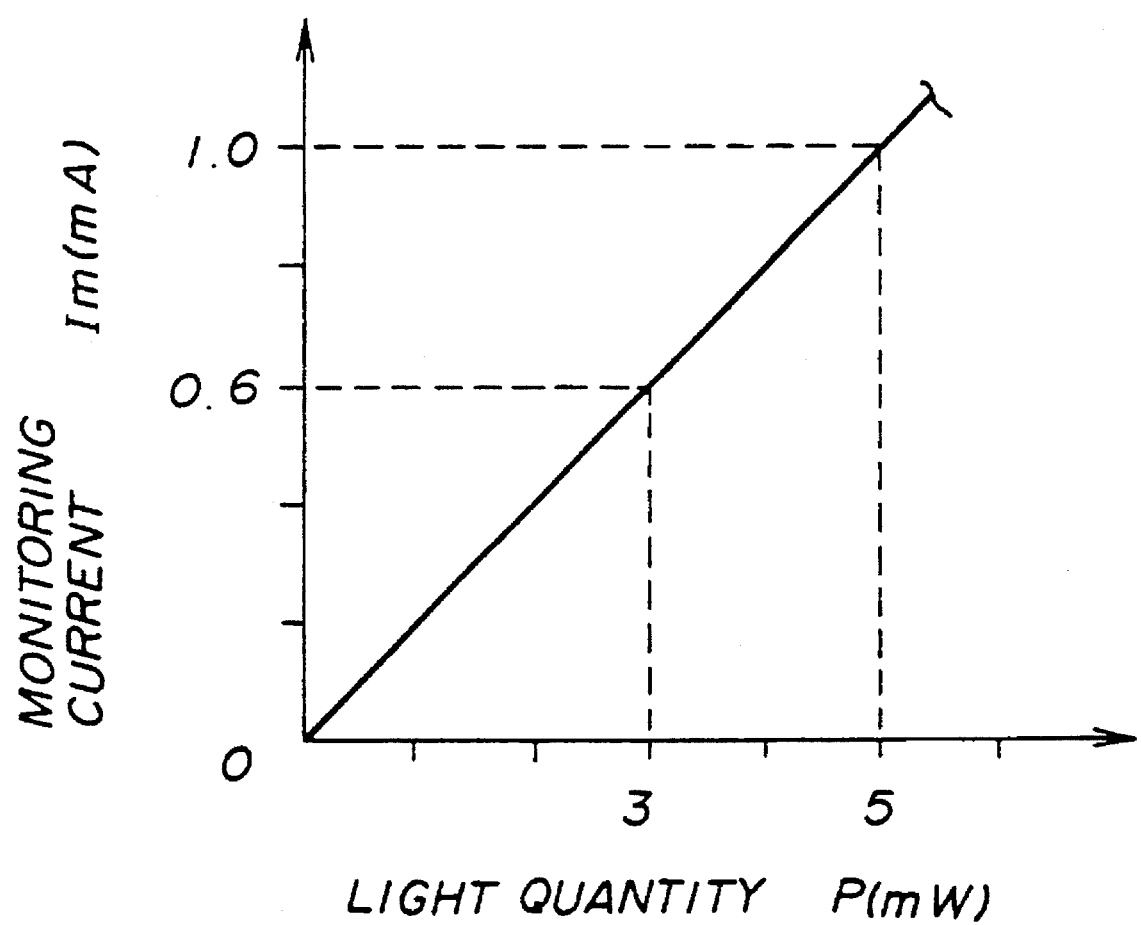
FIG. 3 is a graph showing a relationship between the light quantity emitted from the laser diode and a monitoring electric current flowing through the photo diode as a result of the light quantity being sensed.
Figure 4:
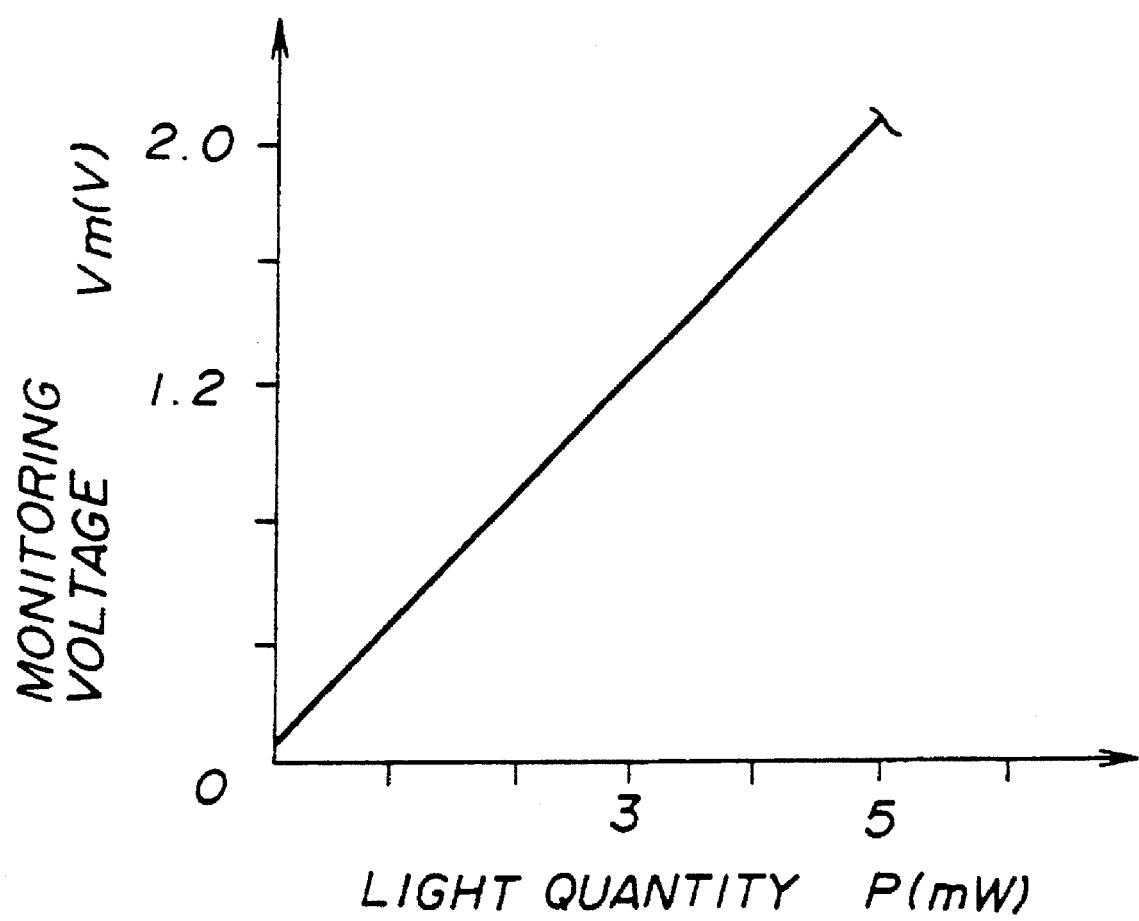
FIG. 4 is a graph showing a relationship between the light quantity emitted from the laser diode and a monitoring voltage depending on the monitoring electric current flowing through the photo diode.

The CPU 6 executes the following operations. After APC is started, outputs of the comparator 12 COMP.12) and the comparator 11(COMP.11) are checked respectively in S11 and S12 shown in FIG. 9, and data D/A set value Ds) set in the D/A converter 7 is increased in S13. When the output of the comparator 11 is inverted from "0" to "1", a current(at this moment ) D/A set value Ds is saved(stored) in a memory. When the output of the comparator 12 is inverted to "1" before the output of the comparator 11 is inverted to "1", S18 is executed after S11, that is, the CPU 6 determines such a condition is an abnormal condition of the comparator 11, then indicates "error" in S20 by means of an alarm annunciator 6a as shown in FIG. 1. This operation corresponds to that of the above mentioned abnormal condition sensing means.

After the D/A set value Ds is set as a result of the output of the comparator 11 being inverted to "1", the CPU 6 checks the output of the comparator 12 in S15 and further increases the D/A set value Ds in S16, then, when the output of the comparator 12 is inverted to "1", a current D/A set value Ds is saved in a memory, and then APC is finished. The operation to be executed in S15, S16 and S17 is similar to that executed in the above mentioned S4, S5, S6 shown in FIG. 5.

Figure 5:
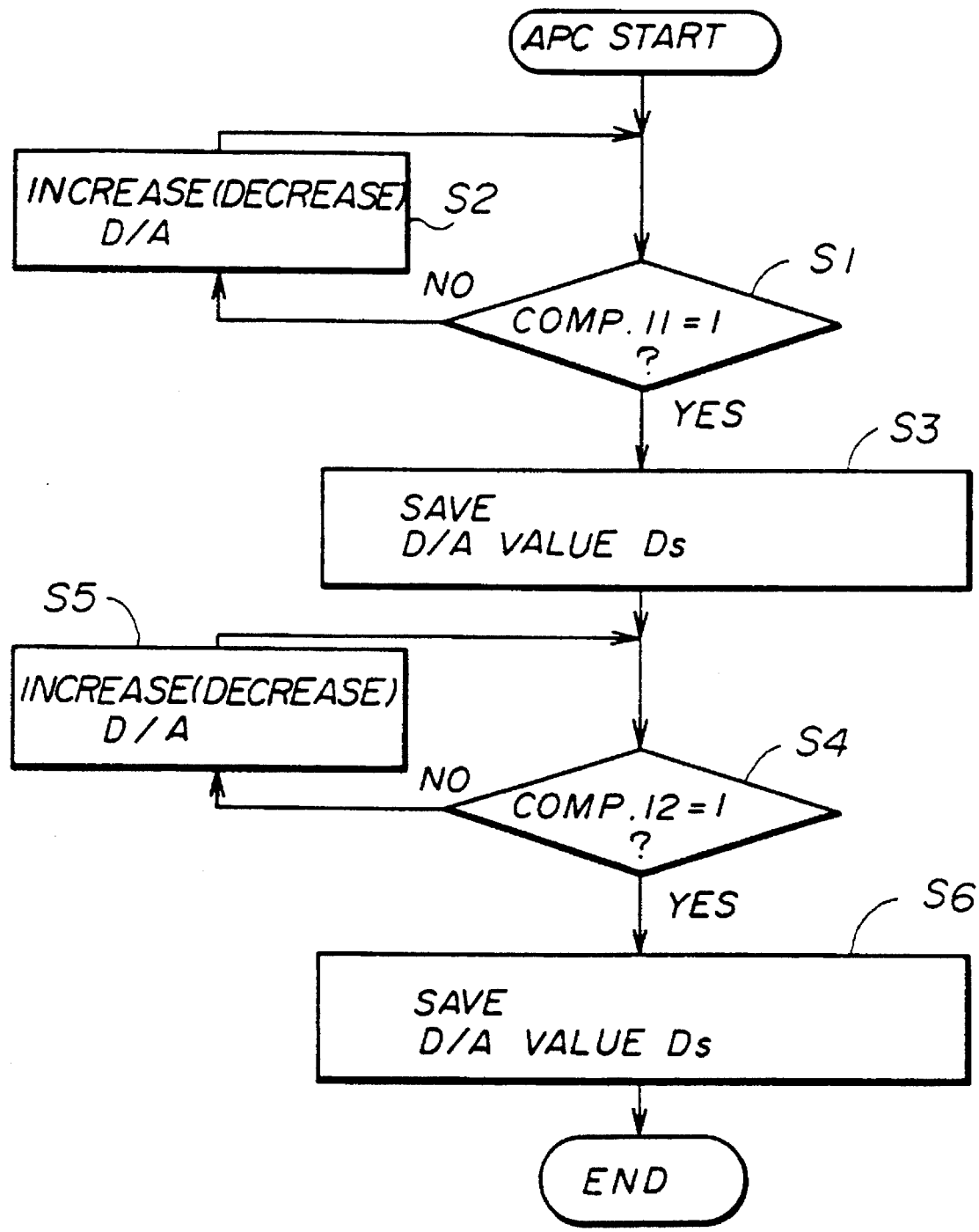
FIG. 5 shows an operating flow chart of an APC(automatic power control) process performed by a CPU in the control block shown in FIG. 1 in the related art.
Figure 6:
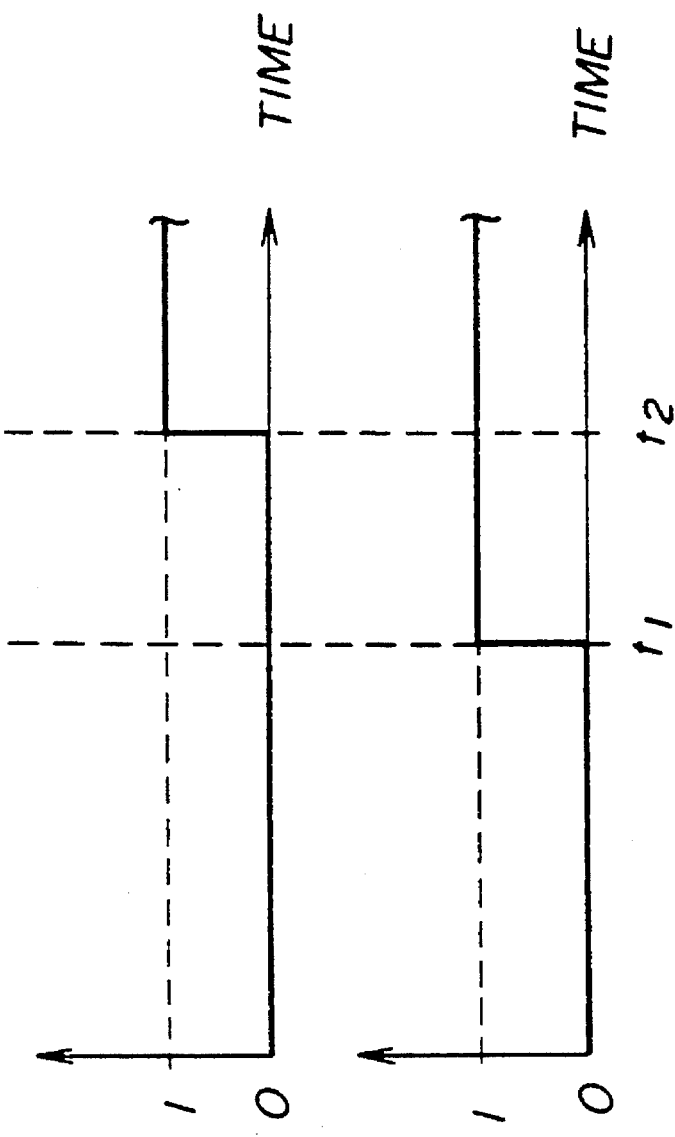
FIGS. 6A and 6B show operating timing charts of comparators when the light quantity emitted from the laser diode is increased when the APC process in the related art is under a normal condition.
Figure 7:
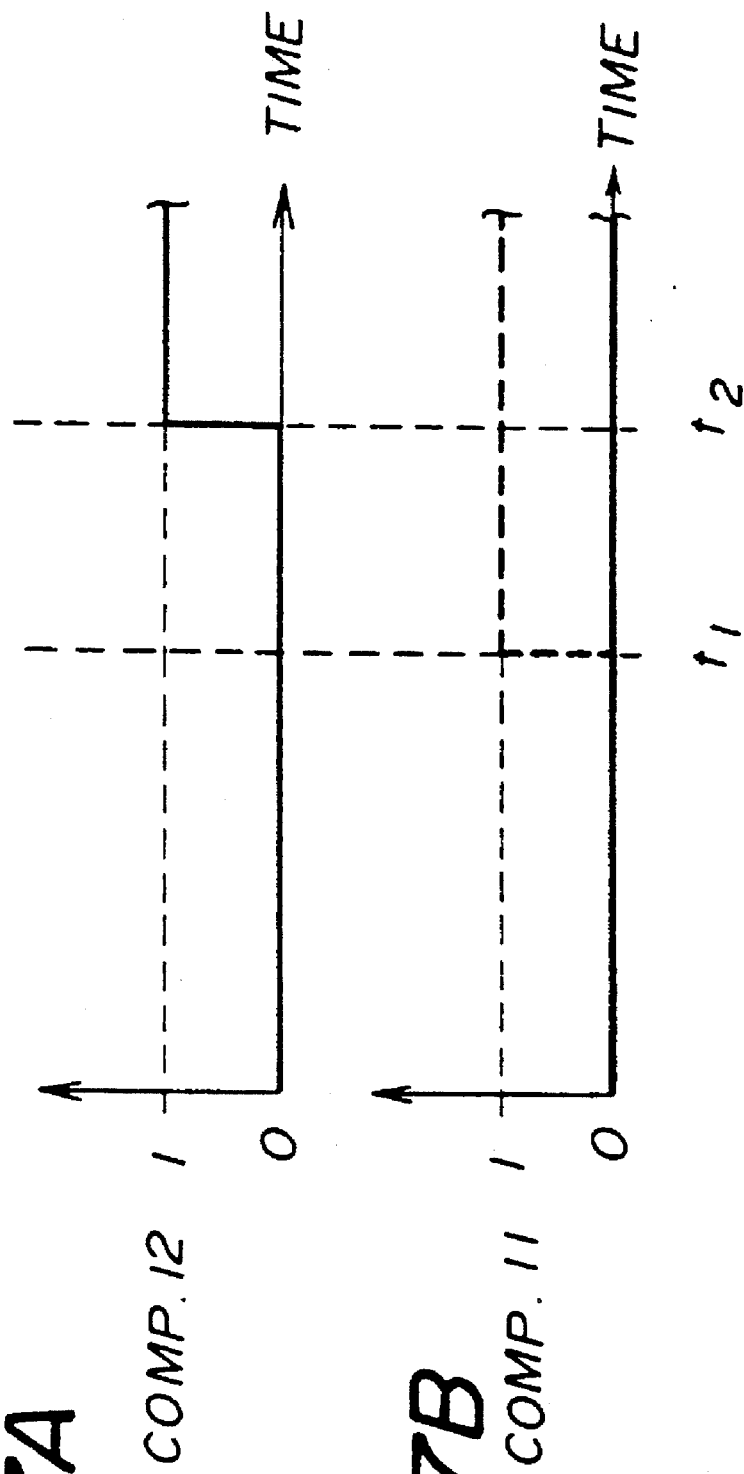
FIGS. 7A and 7B show operating timing charts of the comparators when the light quantity emitted from the laser diode is increased when the comparator is under an abnormal condition in the APC process in the related art.
Figure 8:
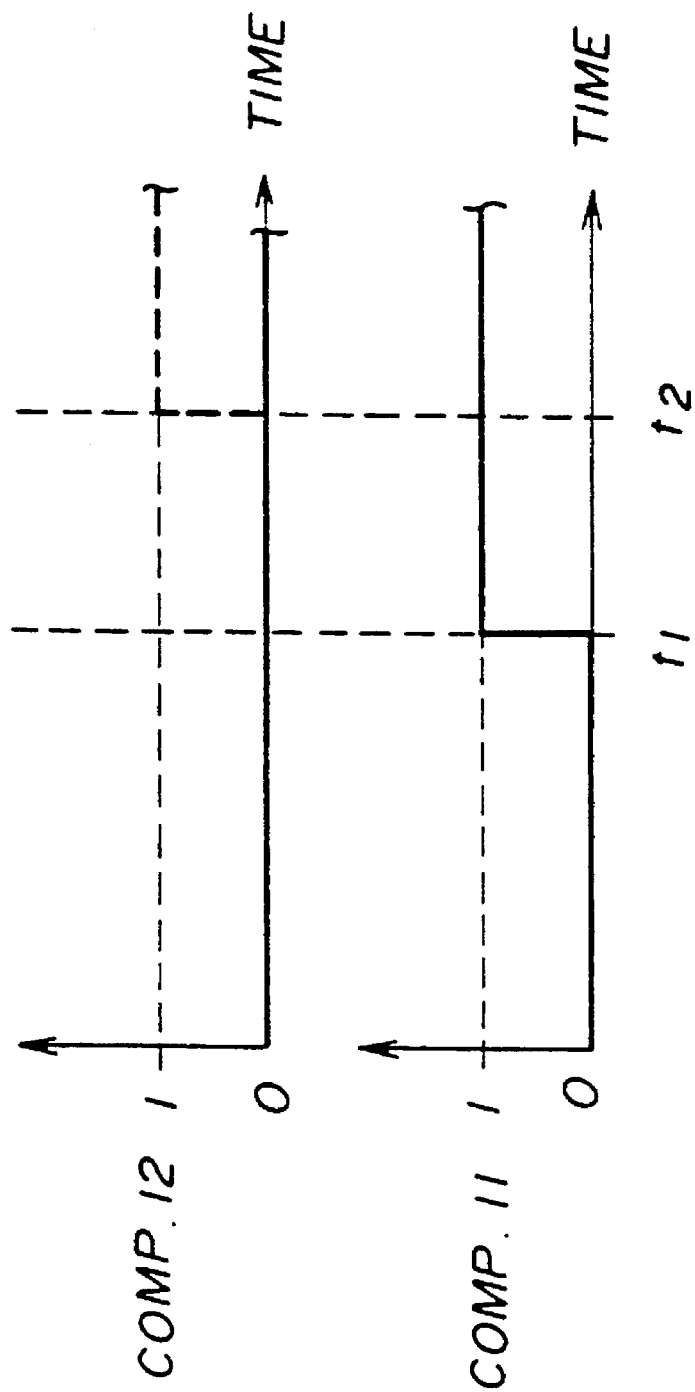
FIGS. 8A and 8B show operating timing charts of the comparator when the light quantity emitted from the laser diode is increased when the comparator is under an abnormal condition in the APC process in the related art.

In this embodiment, which embodiment is described with reference to FIG. 9, the operation executed by the CPU 6, when an abnormal condition occurs in the comparator 12, is as the same as the example of the operation shown in FIG. 5. However, an operation executed by the CPU 6, when an abnormal condition occurs in the comparator 11, is different from the above mentioned example of the operation shown in FIG. 5. That is, the light quantity emitted by the laser diode 1 still continues to increase after it exceeds the first light quantity $P_1$, however, when the light quantity emitted by the laser diode 1 becomes equal to the second light quantity $P_2$ as a result of the D/A set value Ds still continuing to increase, such an abnormal condition in the comparator 11 can be detected at this time. Therefore, damage in the laser diode 1 can be prevented, which damage may occur as a result of an excess quantity of light being emitted.

Figure 10:
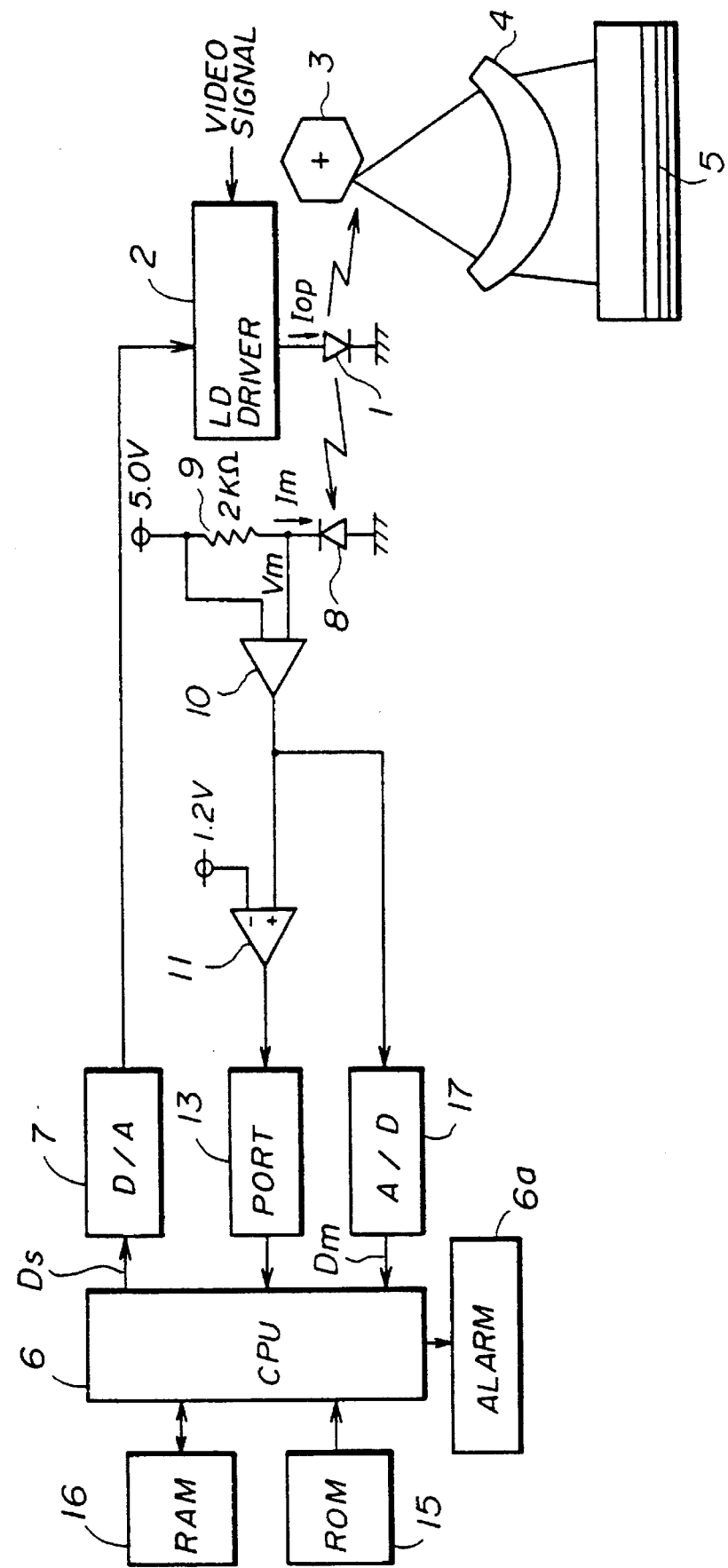
FIG. 10 shows a control block diagram of a writing-with-light part of a laser printer of a second embodiment according to the present invention.

A composition of a writing-with-light part of a laser printer of a second embodiment of the light quantity setting value determination apparatus and method according to the present invention and an image forming apparatus according to the present invention are described below with reference to FIG. 10(showing a control block diagram). The composition shown in FIG. 10 is a modification of the composition shown in FIG. 1. The comparator 12 and the port 14 of FIG. 1 are replaced by A/D(analog/digital) converter 17(which acts as an analog/digital converting means). Further, the comparator 11 acts as a comparing means. The rest of the parts of the composition of the writing-with-light part shown in FIG. 10 correspond to parts shown in FIG. 1, and thus a description of such corresponding parts in the composition in FIG. 10 is omitted, and numerals the same as those used for the parts in FIG. 1 are given to the corresponding parts in FIG. 10.

An APC processing operation to be executed by the CPU 6 in the above mentioned second embodiment according to the present invention is described below with reference to FIGS. 11A through 11C(showing operation flow charts).

After APC is started, the CPU 6 increases the D/A set value Ds set in the D/A converter 7 in S33, and while this increasing operation is being performed in S33, the CPU 6 also checks respectively A/D value Dm(this means hereinafter a value obtained as a result of a monitoring voltage Vm being converted into digital data by means of the A/D converter 17) and the output of the comparator 11 in S31 and S32, respectively.

Then, when the light quantity emitted by the laser diode 1 becomes equal to a first light quantity $P_1$, the output of the comparator 11 is inverted to "1" as shown at $t_1$ in FIG. 13B. Then, S35 in FIG. 11B is executed after S32(via S34), that is, a current D/A set value Ds is saved(stored) in a memory. At the same time, this D/A set value Ds is temporarily stored in a register in S36.

Then, the D/A set value Ds is further increased, so that the light quantity of the laser diode 1 becomes equal to a second light quantity $P_2$. Then, the A/D value Dm becomes equal to a value which is, in this second embodiment, 1.67 times the value temporarily stored, as mentioned above, in the register. Then, S39 is executed after S37, that is, a current D/A set value Ds is saved in a memory in S39, APC then being finished.

The comparator 11 is inverted when the monitoring voltage Vm becomes equal to a predetermined value(for example in the second embodiment, this value is 1.2 V). Thus, a current(at this moment) A/D value Dm should be a predetermined value $Dm_1$, which A/D value Dm is obtained as a result of Vm being converted to a digital signal. This value $Dm_1$ can be predetermined to be at least in a range such as, in this second embodiment, between 55 and 68, even if this value may slightly vary due to variations in the characteristics of relevant parts, etc.

Therefore, an A/D value $Dm_2$ can be determined by using this predetermined $Dm_1$, which $Dm_2$ is used for determining a D/A value $Ds_2$ to be set in the D/A converter 7 so that the second light quantity $P_2$ is emitted from the laser diode 1. $Ds_2$ is determined(as described below in S37, S38 and S39 shown in FIG. 11B) by using the $Dm_2$ obtained as a result of multiplying $Dm_1$ by the above mentioned predetermined value(1.67 in this embodiment). This operation corresponds to the above mentioned operation performed by the complementary determining means.

Furthermore, there is another method useful for determining $Dm_2$ which is faster than the above mentioned method in which $Dm_1$ is multiplied by 1.67. This other method is one in which a reference table is used, $Dm_2$ being obtained by a predetermined relation represented in this reference table. The reference table is previously stored in a memory such as a ROM 15 shown in FIG. 10 after the reference table is previously obtained as a result of some values being multiplied by 1.67. An example of the reference table is shown in FIG. 12. In FIG. 12, the (B) value of each line is obtained as a result of the value (A) of each line being multiplied by 1.67.

Figure 11A:
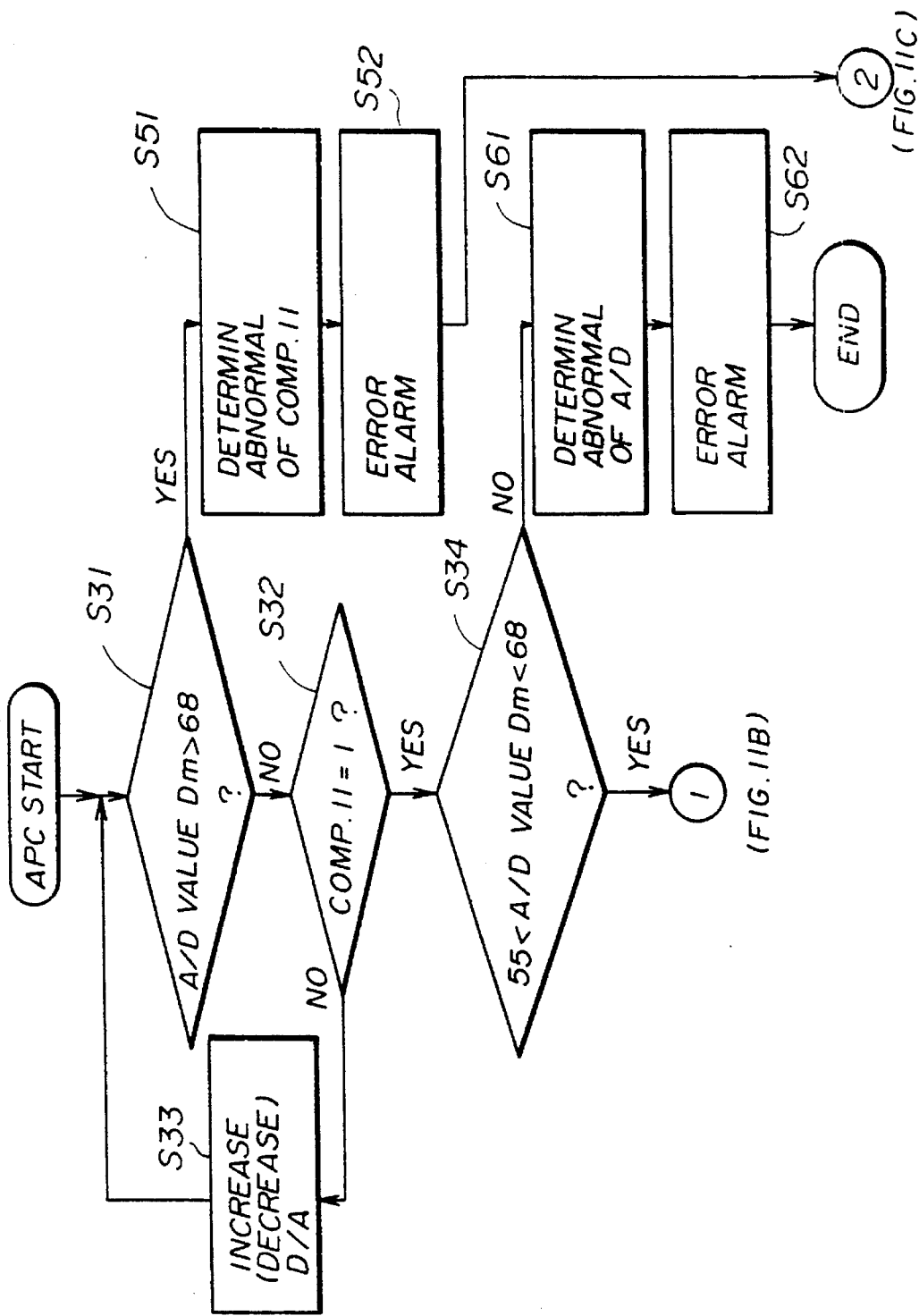
FIGS. 11A through 11C show operating flow charts of the APC process performed by the CPU in the control block of the second embodiment according to the present invention shown in FIG. 10.
Figure 11B:
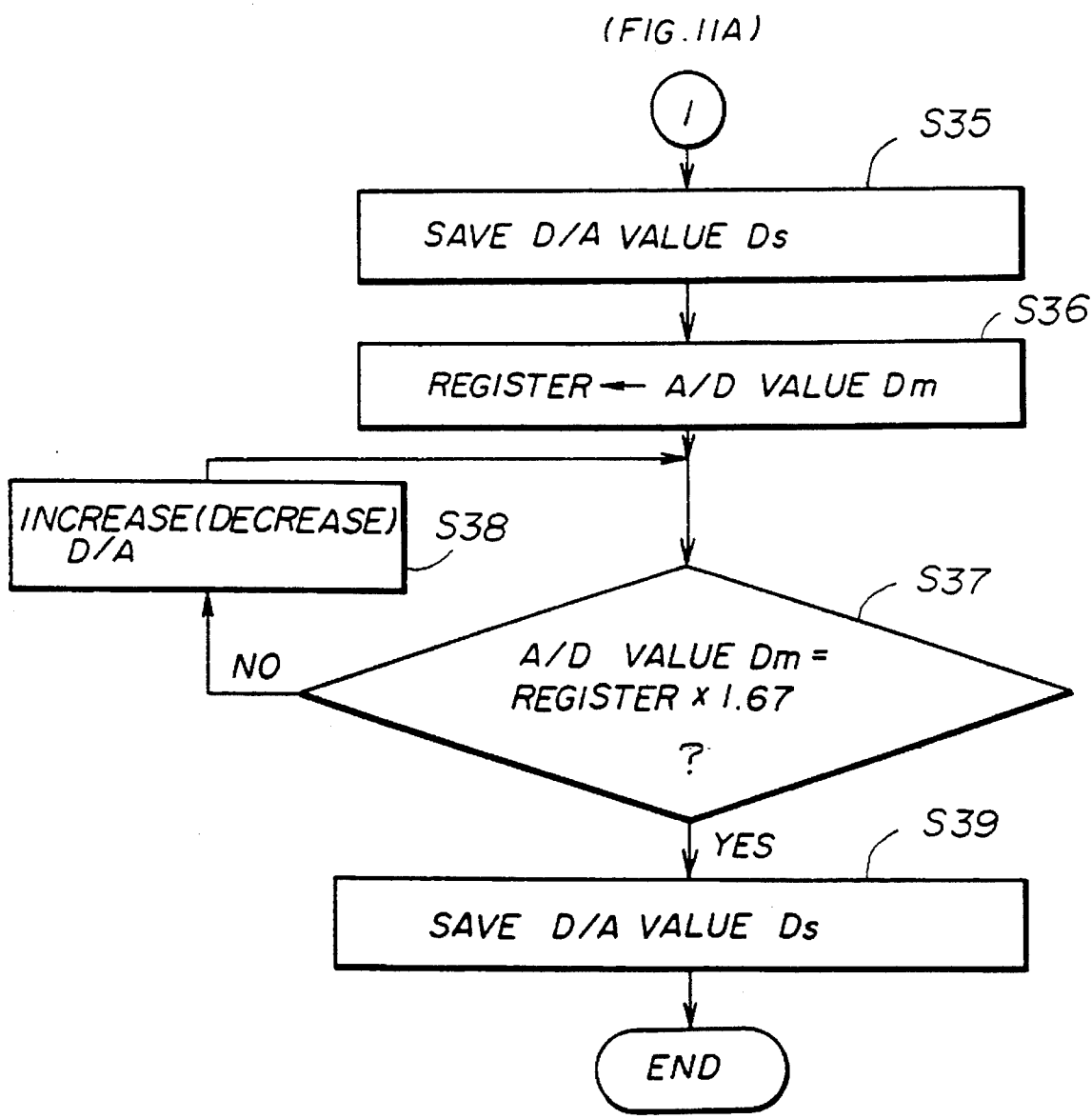
Figure 11C:
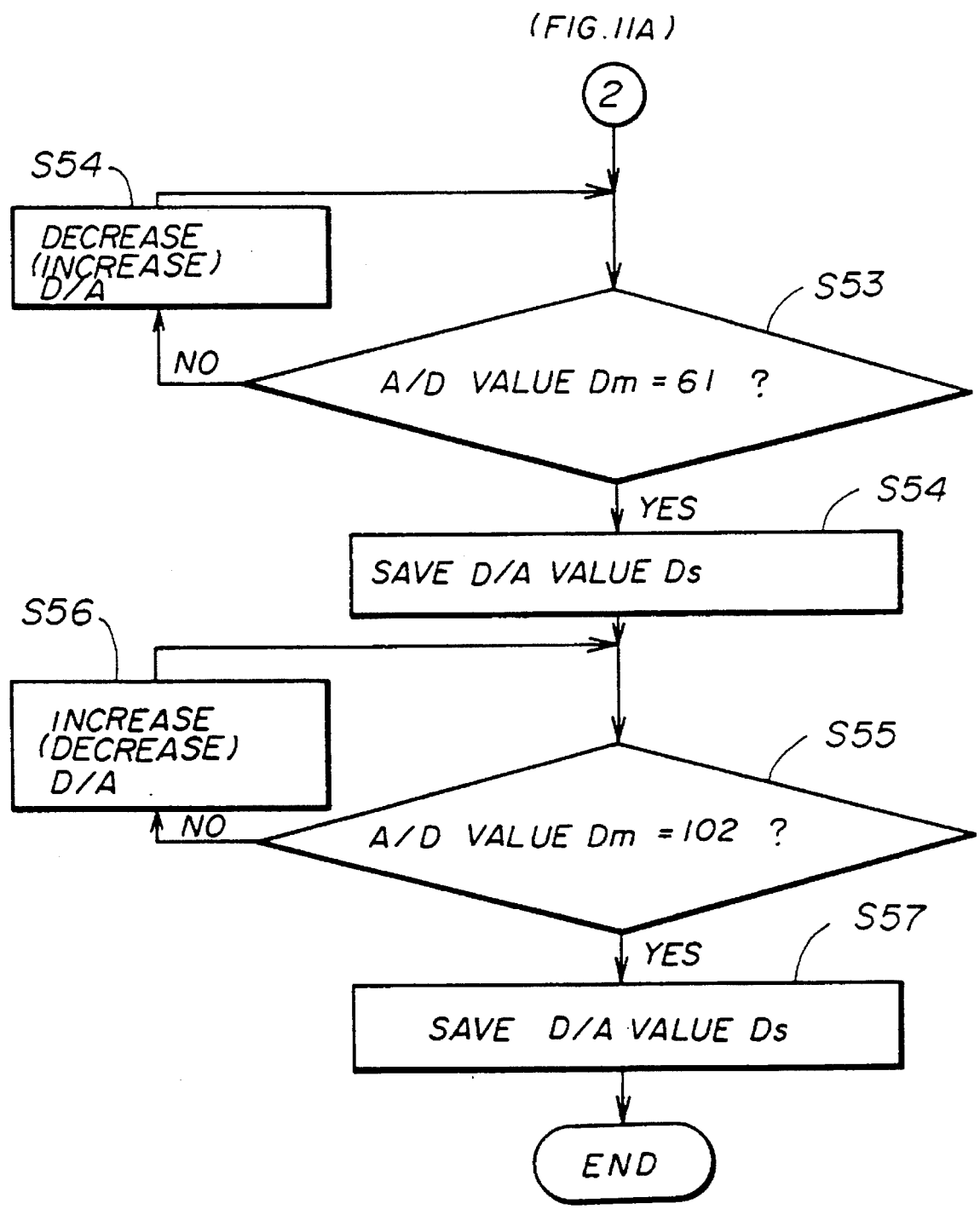

In this embodiment, the CPU 6 checks whether or not the A/D value Dm exceeds "68" in S31 of FIG. 11A. The A/D value Dm increases as a result of the light quantity P emitted from the laser diode 1 being increased. However, if an abnormal condition occurs in the comparator 11, which condition results in the output of the comparator 11 not being inverted into "1" when the A/D value Dm exceeds "68", at a time $t_{14}$ as shown in FIGS. 14A and 14B, S51 and S52 are successively executed after the step S31. This means that the CPU 6 determines that this condition is an abnormal condition occurring in the comparator 11, and thus "error" is then indicated in the alarm annunciator 6a. Thus, an operator who finds the "error" can stop any further increase in the light quantity P being emitted from the laser diode 1, thus preventing the laser diode 1 from being damaged as a result of an excess emitting of the light quantity P. This operation of the CPU 6 corresponds to the above mentioned operation of the abnormal condition sensing means.

Further, in this embodiment, after the step S52, steps S53, S54 are executed. This means that after "error" is indicated, D/A set value Ds is decreased. Then when the A/D value Dm becomes "61", which value is a central value of the above mentioned range between "55" and "68", a current D/A set value Ds is determined to be $Ds_1$ corresponding to the first light quantity $P_1$, and then the current Ds is saved as $Ds_1$ in S54. Then the D/A set value Ds is again increased in S56.

Next a current D/A set value Ds is determined to be $Ds_1$ corresponding to the second light quantity $P_2$ when the A/D value Dm becomes "102" in S55, and then the current Ds is saved as $Ds_2$ in S57. It is therefore possible to soon execute a subsequent operation, such as writing-with-light with a light quantity adjustment, using such D/A set values $Ds_1$ and $Ds_2$ determined and saved in S54 and S57, respectively. Even if the accuracy of the D/A set values $Ds_1$ and $Ds_2$ may be degraded slightly as a result of such complementarily determining steps in S53 and S55, this is offset by the fact that the subsequent operation can be soon executed, as it is not necessary to wait until the cause of the above mentioned abnormal condition in the comparator 11 is removed.

Further, in a case where an abnormal condition occurs in the A/D converter 17, the A/D value Dm is not in the above mentioned range between "55" and "68" in S34 in FIG. 11A when the output of the comparator 11 is inverted into "1" in S32 after APC has started, as shown at a time $t_{11}$ in FIGS. 15A and 15B. Then step S61 is executed after S34. This means that the CPU 6 determines that such an above condition is an abnormal condition in the A/D converter 17. "Error" is then indicated in the alarm annunciator 6a in S62. Thus, as an operator who finds the "error" can prevent a further increase in the light quantity P emitted from the laser diode 1, damage to the laser diode 1 resulting from an excess emitting of the light quantity P is prevented. This operation of the CPU 6 also corresponds to the one performed by the above mentioned abnormal condition sensing means.

The above mentioned advantages of the present invention will now be summarized. A first advantage is that damage, such as damage to a laser diode, resulting from an incorrect operation of the light quantity sensing means, can be prevented since the abnormal condition sensing means senses an abnormal condition such as an incorrect operation.

A second advantage is that an increased amount of information for determining light quantity setting values can be obtained as a result of the information including not only the output of a comparator but also the output of an A/D converter. Thus, such information can be utilized for various purposes so that a value, originally provided by the comparator and corresponding to a predetermined light quantity can be determined by using data obtained from the A/D converter, even if the comparator falls into an abnormal condition.

A third advantage is that a subsequent operation such as a printing operation can be executed as a result of APC being finished even if a part of APC falls in an abnormal condition, as it is not necessary to wait until the abnormal condition is removed. This is possible because another part complements(this means that the other part complementarily determines the output of) the part which had to provide the output, and falls into an abnormal condition.

A fourth advantage is that a plurality of light quantity setting values can be determined since the output of a comparator and an A/D converter can be used. This means that a plurality of comparators each of which corresponds to the plurality of light quantity setting values, is not needed. Instead, one comparator and one A/D converter will be sufficient( Thus, the number of parts needed for APC can be minimized.). That is, a first light quantity setting value corresponding to a first light quantity is determined to be a light quantity setting value at a moment when the output of the comparator is inverted. An output value of the A/D converter at the moment when the comparator is inverted as mentioned above, is referred to as being "a first A/D converter output value". Then a second light quantity setting value can be determined to be a light quantity setting value at a moment when the output value of the A/D converter becomes equal to a value which corresponds to the second light quantity setting value. This output value of the A/D converter which corresponds to the second light quantity setting value is referred to as being "a second A/D converter output value". The second A/D converter output value can be obtained as a result of using the above mentioned first A/D converter output value.

In a first method for obtaining(determining ) such a second A/D converter output value, the above mentioned first A/D converter output value is multiplied by a predetermined constant value corresponding to the second light quantity setting value.

Regarding a second method for obtaining( determining) the above mentioned second A/D converter output value, reference is made to a predetermined reference table which shows a relationship between the first A/D converter output value and the second A/D converter output value. The second method is superior to the first method because the time needed for referring to a reference table is shorter than that needed for multiplying the first A/D converter output value.

The present invention is not limited to determining the above two light quantity setting values, and a composition for determining more than two light quantity setting values is possible in the present invention. Another light quantity setting value can be determined by a method similar to that for determining the second light quantity setting value described above.

Further, the present invention is not limited to determination of the light quantity setting values with mainly increasing the D/A value Ds. Instead, another method is possible such as determining the light quantity setting value by mainly decreasing the D/A value Ds, that is, decreasing the D/A value Ds in S2 and S5 in FIG. 5, S12 and S16 in FIG. 9, and S33, S38 and S56 in FIGS. 11A through 11C, and increasing the D/A value Ds in S54 in FIG. 11C. In a case where this other method is applied, substitute parts for relevant parts are needed in these FIGS. 5, 9, and 11A through 11C, according to whether the method of determining by mainly decreasing the D/A value Ds or by mainly increasing it is applied.

Furthermore, the present invention is not limited to the above described embodiments, and variations and modifications may be made without departing from the scope of the present invention.

What is claimed is:

1. A light quantity setting value determination apparatus comprising:

light quantity sensing means for sensing when a light quantity emitted by a light emitting means is equal to any one of a plurality of different predetermined light quantities, said light quantity sensing means then providing a plurality of light sensing signals corresponding to said plurality of different predetermined light quantities;

setting value determination means for determining in response to said plurality of light sensing signals provided by said light quantity sensing means a plurality of light quantity setting values corresponding to said different predetermined light quantities, said plurality of light quantity setting values being then used for driving said light emitting means so that said light emitting means emits said plurality of different predetermined light quantities corresponding to said plurality of light sensing signals; and abnormal condition sensing means for sensing when said light quantity sensing means does not operate correctly, said abnormal condition sensing means then processing a predetermined operation so as to prevent an undesirable condition being caused by said incorrect operation, wherein said abnormal condition sensing means senses when said light quantity sensing means does not operate correctly by sensing when a sequence of said plurality of light sensing signals provided by said light quantity sensing means is not correct.

2. The light quantity setting value determination apparatus according to claim 1, wherein said undesirable condition is one in which said light emitting means emits excessive light quantities.

3. The light setting value determination apparatus according to claim 1, wherein said light quantity sensing means comprises a plurality of sensing circuits, each thereof sensing when a light quantity emitted by said light emitting means is equal to a respective one of said plurality of different predetermined light quantities.

4. The light quantity setting value determination apparatus according to claim 1, wherein:

said abnormal condition sensing means senses when said light quantity sensing means does not operate correctly by sensing when said plurality of light sensing signals are provided from said light quantity sensing means in a certain sequence while a light quantity emitted by said light emitting means is being either gradually increased or gradually decreased so as to be equal to any one of said plurality of different predetermined light quantities successively, said certain sequence being not a sequence corresponding to a sequence, with respect to magnitudes of said plurality of different predetermined light quantities, according to which sequence the light quantity emitted by said light emitting means was thus either gradually increased or gradually decreased to be equal to any one of said plurality of different predetermined light quantities successively when said plurality of light sensing signals were provided from said light quantity sensing means in said certain sequence.

5. The light quantity setting value determination apparatus according to claim 1, wherein:

said abnormal condition sensing means senses when said light quantity sensing means does not operate correctly by sensing when a certain signal of said plurality of light sensing signals is first provided from said light quantity sensing means while a light quantity emitted by said light emitting means is being either gradually increased or gradually decreased, said certain signal being not a signal corresponding to the smallest one of said plurality of different predetermined light quantities if said certain signal is provided while a light quantity emitted by said light emitting means is being gradually increased, and said certain signal being not a signal corresponding to the largest one of said plurality of different predetermined light quantities if said certain signal is provided while a light quantity emitted by said light emitting means is being gradually decreased.

6. The light quantity setting value determination apparatus according to claim 1, wherein said setting value determination means determines said plurality of light quantity setting values by mainly substantially increasing a light quantity.

7. The light quantity setting value determination apparatus according to claim 1, wherein said setting value determination means determines said plurality of light quantity setting values by mainly substantially decreasing a light quantity.

8. A light quantity sensing means for sensing when a light quantity emitted by a light emitting means is equal to any one of a plurality of different predetermined light quantities, said light quantity sensing means then providing a plurality of light sensing signals corresponding to said plurality of different predetermined light quantities;

setting value determination means for determining in response to said plurality of light sensing signals provided by said light quantity sensing means a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and complementary determining means for sensing when said light quantity sensing means does not operate correctly so that said plurality of light sensing signals are not provided correctly, said complementary determining means then complementarily determining a correct light sensing signal of said plurality of light sensing signals.

9. The light setting value determination apparatus according to claim 8, wherein said light quantity sensing means comprises a plurality of sensing circuits, each thereof sensing when a light quantity emitted by said light emitting means is equal to a respective one of said plurality of different predetermined light quantities.

10. A light quantity setting value determination apparatus comprising:

light quantity sensing means for sensing when a light quantity emitted by a light emitting means is equal to any one of a plurality of different predetermined light quantities, said light sensing means then providing a plurality of light sensing signals corresponding to said plurality of different predetermined light quantities; and setting value determination means for determining in response to said plurality of light sensing signals provided by said light quantity sensing means a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals;

wherein said light quantity sensing means comprises: light quantity measuring means for measuring a light quantity emitted by said light emitting means; analog/digital converting means for converting a measuring signal acting as an analog signal provided by said light quantity measuring means into a digital signal; and comparing means for comparing said measuring signal acting as an analog signal with a predetermined reference value, said comparing means then providing a result of the comparison as a binary-level signal, wherein said setting value determination means determines at least one first light quantity setting value corresponding to one first light quantity of said plurality of light quantities by using a result provided by said comparing means, and determines another light quantity setting value by using a value obtained as a result of multiplying an output of said analog/digital converting means by a predetermined value, said output of said analog/digital converting means corresponding to said first light quantity.

11. A light quantity setting value determination apparatus comprising:

light quantity sensing means for sensing when a light quantity emitted by a light emitting means is equal to any one of a plurality of different predetermined light quantities, said light sensing means then providing a plurality of light sensing signals corresponding to said plurality of different predetermined light quantities;

setting value determination means for determining in response to said plurality of light sensing signals provided by said light quantity sensing means a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and wherein said light quantity sensing means comprises: light quantity measuring means for measuring a light quantity emitted by said light emitting means; analog/digital converting means for converting a measuring signal acting as an analog signal provided by said light quantity measuring means into a digital signal; and comparing means for comparing said measuring signal acting as an analog signal with a predetermined reference value, said comparing means then providing a result of the comparison as a binary-level signal, wherein said setting value determination means determines at least one first light quantity setting value corresponding to one first light quantity of said plurality of light quantities by using a result provided by said comparing means, and determines another light quantity setting value by using a value obtained as a result of making reference to a predetermined relation between said value and an output of said analog/digital converting means, said output of said analog/digital converting means corresponding to said first light quantity.

12. The light setting value determination apparatus according to claim 10, wherein if it is determined that said comparing means develops trouble, said setting value determination means uses times when output of said analog/digital converting means reaches predetermined values for determining said plurality of light setting values.

13. A light quantity setting value determination method comprising the following steps:

(a) sensing when a light quantity emitted by a light emitting means is equal to any one of a plurality of different predetermined light quantities, said light quantity sensing means then providing a plurality of light sensing signals corresponding to said plurality of different predetermined light quantities;

(b) determining in response to said plurality of light sensing signals provided by said step (a) a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals;

(c) sensing when said step (a) does not operate correctly, said step (c) then processing a predetermined operation so as to prevent an undesirable condition being caused by said incorrect operation, wherein said step (c) senses when said step (a) does not operate correctly by sensing when a sequence of said plurality of light sensing signals provided by said step (c) is not correct.

14. The light quantity setting value determination method according to claim 13, wherein said undesirable condition is one in which said light emitting means emits excessive light quantities.

15. The light setting value determination method according to claim 13, wherein said step (a) is performed through a plurality of sensing circuits, each thereof sensing when a light quantity emitted by said light emitting means is equal to a respective one of said plurality of different predetermined light quantities.

16. The light quantity setting value determination method according to claim 13, wherein:

said step (c) senses when said step (a) does not operate correctly by sensing when said plurality of light sensing signals are provided by said step (a) in a certain sequence while a light quantity emitted by said light emitting means is being either gradually increased or gradually decreased so as to be equal to said plurality of different predetermined light quantities successively, said certain sequence being not a sequence corresponding to a sequence, with respect to magnitudes of said plurality of different predetermined light quantities, according to which the light quantity emitted by said light emitting means is thus either gradually increased or gradually decreased to be equal to said plurality of different predetermined light quantities successively when said plurality of light sensing signals is provided by said step (a) in said certain sequence.

17. The light quantity setting value determination method according to claim 13, wherein:

said step (c) senses when said step (a) does not operate correctly by sensing when a certain signal of said plurality of light sensing signals is first provided by said step (a) while a light quantity emitted by said light emitting means is being either gradually increased or gradually decreased, said certain signal being not a signal corresponding to the smallest one of said plurality of different predetermined light quantities if said certain signal is provided while a light quantity emitted by said light emitting means is being gradually increased, and said certain signal being not a signal corresponding to the largest one of said plurality of different predetermined light quantities if said certain signal is provided while a light quantity emitted by said light emitting means is being gradually decreased.

18. The light quantity setting value determination method according to claim 13, wherein said step (b) determines said plurality of light quantity setting values by mainly substantially increasing a light quantity.

19. The light quantity setting value determination method according to claim 13, wherein said step (b) determines said plurality of light quantity setting values by mainly substantially decreasing a light quantity.

20. A light quantity setting value determination method comprising the following steps:

(a) sensing when a light quantity emitted by a light emitting means is equal to any one of a plurality of different predetermined light quantities, said step (a) then providing a plurality of light sensing signals corresponding to said plurality of different predetermined light quantities; and (b) determining in response to said plurality of light sensing signals provided by said step (a) a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and (c) sensing when said light quantity sensing means does not operate correctly so that said plurality of light sensing signals are not provided correctly, then complementarily determining a correct light sensing signal of said plurality of light sensing signals.

21. The light setting value determination method according to claim 20, wherein said step (a) is performed through a plurality of sensing circuits, each thereof sensing when a light quantity emitted by said light emitting means is equal to a respective one of said plurality of different predetermined light quantities.

22. A light quantity setting value determination method comprising the following steps:

(a) sensing when a light quantity emitted by a light emitting means is equal to any one of a plurality of different predetermined light quantities, said step (a) then providing a plurality of light sensing signals corresponding to said plurality of different predetermined light quantities; and (b) determining in response to said plurality of light sensing signals provided by said step (a) a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and wherein said step (a) comprises the following steps: (a-1) measuring a light quantity emitted by said light emitting means; (a-2) converting a measuring signal acting as an analog signal provided by said step (a-1) into a digital signal; and (a-3) comparing said measuring signal acting as an analog signal with a predetermined reference value, said comparing means then providing a result of the comparison as a binary-level signal, wherein said step (b) determines at least one first light quantity setting value corresponding to one first light quantity of said plurality of light quantities by using a result provided by said step (a-3), and determines another light quantity setting value by using a value obtained as a result of multiplying an output of said step (a-2) by a predetermined value, said output of said step (a-2) corresponding to said first light quantity.

23. A light quantity setting value determination method comprising the following steps:

(a) sensing when a light quantity emitted by a light emitting means is equal to any one of a plurality of different predetermined light quantities, said step (a) then providing a plurality of light sensing signals corresponding to said plurality of different predetermined light quantities; and (b) determining in response to said plurality of light sensing signals provided by said step (a) a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and wherein said step (a) comprises the following steps: (a-1) measuring a light quantity emitted by said light emitting means; (a-2) converting a measuring signal acting as an analog signal provided by said step (a-1) into a digital signal; and (a-3) comparing said measuring signal acting as an analog signal with a predetermined reference value, said comparing means then providing a result of the comparison as a binary-level signal, wherein said step (b) determines at least one first light quantity setting value corresponding to one first light quantity of said plurality of light quantities by using a result provided by said step (a-3), and determines another light quantity setting value by using a value obtained as a result of referring to a predetermined relation between said value and an output of said step (a-2), said output of said step (a-2) corresponding to said first light quantity.

24. An image forming apparatus comprising:

light emitting means, an image being formed by means of light of a plurality of different predetermined light quantities emitted by said light emitting means;

light quantity sensing means for sensing when a light quantity emitted by said light emitting means is equal to any one of said plurality of different predetermined light quantities, said light sensing means then providing a plurality of light sensing signals corresponding to said plurality of different predetermined light quantities;

setting value determination means for determining in response to said plurality of light sensing signals provided by said light quantity sensing means a plurality of light quantity setting values corresponding to said different predetermined light quantities corresponding to said plurality of light sensing signals; and abnormal condition sensing means for sensing when said light quantity sensing means does not operate correctly, said abnormal condition sensing means then processing a predetermined operation so as to prevent an undesirable condition being caused by said incorrect operation, wherein said abnormal condition sensing means senses when said light quantity sensing means does not operate correctly by sensing when a sequence of said plurality of light sensing signals provided by said light quantity sensing means is not correct.

25. An image forming apparatus comprising:

light emitting means, an image being formed by means of light of a plurality of different predetermined light quantities emitted by said light emitting means;

light quantity sensing means for sensing when a light quantity emitted by said light emitting means is equal to any one of said plurality of different predetermined light quantities, said light sensing means then providing a plurality of light sensing signals corresponding to said plurality of different predetermined light quantities; and setting value determination means for determining in response to said plurality of light sensing signals provided by said light quantity sensing means a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and wherein said light quantity sensing means comprises: light quantity measuring means for measuring a light quantity emitted by said light emitting means; analog/digital converting means for converting a measuring signal acting as an analog signal provided by said light quantity measuring means into a digital signal; and comparing means for comparing said measuring signal acting as an analog signal with a predetermined reference value, said comparing means then providing a result of the comparison as a binary-level signal, wherein said setting value determination means determines at least one first light quantity setting value corresponding to one first light quantity of said plurality of light quantities by using a result provided by said comparing means, and determines another light quantity setting value by using a value obtained as a result of multiplying an output of said analog/digital converting means by a predetermined value, said output of said analog/digital converting means corresponding to said first light quantity.

26. The image forming apparatus according to claim 25, wherein said setting value determination means determines at least one first light quantity setting value corresponding to one first light quantity of said plurality of light quantities by using a result provided by said comparing means, and determines another light quantity setting value by using a value obtained as a result of making reference to a predetermined relation between said value and an output of said analog/digital converting means, said output of said analog/digital converting means corresponding to said first light quantity.

27. The light quantity setting value determination method according to claim 22, wherein if it is determined that said comparing means develops trouble, said setting value determination means uses times when output of said analog/digital converting means reaches predetermined values for determining said plurality of light setting values.

28. An image forming apparatus comprising:

light emitting means, an image being formed by means of light of a plurality of different predetermined light quantities emitted by said light emitting means;

light quantity sensing means for sensing when a light quantity emitted by said light emitting means equal to any one of said plurality of different predetermined light quantities, said light sensing means then providing a plurality of light sensing signals corresponding to said plurality of different predetermined light quantities; and;

setting value determination means for determining in response to said plurality of light sensing signals provided by said light quantity sensing means a plurality of light quantity setting values corresponding to said different predetermined light quantities, said plurality of light quantity setting values then being used for driving said light emitting means so that said light emitting means emits said plurality of different predetermined light quantities corresponding to said plurality of light sensing signals; and complementary determining means for sensing when said light quantity sensing means does not operate correctly so that said plurality of light sensing signals are not provided correctly, said complementary determining means then complementarily determining a correct light sensing signal of said plurality of light sensing signals.

\* \* \* \* \*